(12) United States Patent
Kracun et al.

(10) Patent No.: US 12,051,405 B2
(45) Date of Patent: Jul. 30, 2024

(54) SPEAKER DIARIZATION

(71) Applicant: Google LLC, Mountain View, CA (US)

(72) Inventors: Aleksandar Kracun, New York, NY (US); Richard Cameron Rose, Hoboken, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/309,900

(22) Filed: May 1, 2023

(65) Prior Publication Data

US 2023/0260507 A1   Aug. 17, 2023

Related U.S. Application Data

(63) Continuation of application No. 17/222,939, filed on Apr. 5, 2021, now Pat. No. 11,670,287, which is a (Continued)

(51) Int. Cl.
*G10L 17/00* (2013.01)
*G10L 15/08* (2006.01)
(Continued)

(52) U.S. Cl.
CPC .............. *G10L 15/08* (2013.01); *G10L 15/22* (2013.01); *G10L 2015/088* (2013.01); (Continued)

(58) Field of Classification Search
CPC ......... G10L 17/00; G10L 17/02; G10L 17/04; G10L 17/06; G10L 17/20; G10L 17/22; G10L 17/24
(Continued)

(56) References Cited

U.S. PATENT DOCUMENTS 8,554,562 B2   10/2013  Aronowitz
9,098,467 B1    8/2015  Blanksteen et al.
(Continued)

FOREIGN PATENT DOCUMENTS

JP   H08-316953 A   11/1996
JP   201772857 A    4/2017
(Continued)

OTHER PUBLICATIONS

Japanese office action for the related application No. 2019-568013 dated Jul. 10, 2020.
(Continued)

*Primary Examiner* — Qi Han
(74) *Attorney, Agent, or Firm* — Honigman LLP; Brett A. Krueger; Grant Griffith

(57) ABSTRACT

Methods, systems, and apparatus, including computer programs encoded on a computer storage medium, for speaker diarization are disclosed. In one aspect, a method includes the actions of receiving audio data corresponding to an utterance. The actions further include determining that the audio data includes an utterance of a predefined hotword spoken by a first speaker. The actions further include identifying a first portion of the audio data that includes speech from the first speaker. The actions further include identifying a second portion of the audio data that includes speech from a second, different speaker. The actions further include transmitting the first portion of the audio data that includes speech from the first speaker and suppressing transmission of the second portion of the audio data that includes speech from the second, different speaker.

18 Claims, 4 Drawing Sheets

Related U.S. Application Data continuation of application No. 16/552,244, filed on Aug. 27, 2019, now Pat. No. 10,978,070, which is a continuation of application No. 15/785,751, filed on Oct. 17, 2017, now Pat. No. 10,403,288.

(51) Int. Cl.
  *G10L 15/22* (2006.01)
  *H04M 3/56* (2006.01)
(52) U.S. Cl.
  CPC .. *G10L 2015/223* (2013.01); *G10L 2015/228* (2013.01); *G10L 17/00* (2013.01); *H04M 3/568* (2013.01); *H04M 2250/74* (2013.01)
(58) Field of Classification Search
  USPC .................... 704/246, 249, 250, 251, 255
  See application file for complete search history.

(56) References Cited

U.S. PATENT DOCUMENTS

| | | | |
|---|---|---|---|
| 9,113,265 | B2 | 8/2015 | Aronowitz et al. |
| 10,171,908 | B1 | 1/2019 | Sinkov et al. |
| 10,490,195 | B1* | 11/2019 | Krishnamoorthy ..... G10L 17/22 |
| 2008/0255842 | A1 | 10/2008 | Simhi |
| 2009/0319269 | A1 | 12/2009 | Aronowitz |
| 2014/0142940 | A1 | 5/2014 | Ziv et al. |
| 2014/0172426 | A1 | 6/2014 | Aratsu et al. |
| 2014/0278435 | A1 | 9/2014 | Ganong, III et al. |
| 2014/0379332 | A1 | 12/2014 | Rodriguez et al. |
| 2015/0039311 | A1 | 2/2015 | Clark et al. |
| 2015/0220507 | A1 | 8/2015 | Mohajer et al. |
| 2015/0310863 | A1 | 10/2015 | Chen et al. |
| 2015/0317977 | A1 | 11/2015 | Manjunath et al. |
| 2016/0125879 | A1 | 5/2016 | Lovitt |
| 2016/0179831 | A1* | 6/2016 | Gruber .................. G10L 19/018 |
| | | | 704/235 |
| 2016/0217792 | A1 | 7/2016 | Gorodetski et al. |
| 2016/0283185 | A1 | 9/2016 | McLaren et al. |
| 2016/0351191 | A1 | 12/2016 | Vilermo et al. |
| 2017/0084295 | A1 | 3/2017 | Tsiartas et al. |
| 2019/0057705 | A1 | 2/2019 | Kar |

FOREIGN PATENT DOCUMENTS

| | | |
|---|---|---|
| JP | 2019-514045 A | 5/2019 |
| WO | 2014/097748 A1 | 6/2014 |
| WO | 2017/165038 A1 | 9/2017 |

OTHER PUBLICATIONS

European Search Report for te related Application No. 21163576.8-1210, Dated Jun. 16, 2021, 10 pages.
JPO, Office Action relating to Application No. 2020-190851, dated Janurary 31, 2022.

* cited by examiner

SPEAKER DIARIZATION

CROSS-REFERENCE TO RELATED APPLICATION

This patent application is a continuation of, and claims priority under 35 U.S.C. § 120 from, U.S. patent application Ser. No. 17/222,939, filed on Apr. 5, 2021, which is a continuation of U.S. patent application Ser. No. 16/552,244, filed on Aug. 27, 2019, which is a continuation of U.S. patent application Ser. No. 15/785,751, filed on Oct. 17, 2017. The disclosures of these prior applications are considered part of the disclosure of this application and are hereby incorporated by reference in their entireties.

TECHNICAL FIELD

This specification generally relates to automated speech recognition.

BACKGROUND

The reality of a speech-enabled home or other environment—that is, one in which a user need only speak a query or command out loud and a computer-based system will field and answer the query and/or cause the command to be performed—is upon us. A speech-enabled environment (e.g., home, workplace, school, etc.) can be implemented using a network of connected microphone devices distributed throughout the various rooms or areas of the environment. Through such a network of microphones, a user has the power to orally query the system from essentially anywhere in the environment without the need to have a computer or other device in front of him/her or even nearby. For example, while cooking in the kitchen, a user might ask the system "how many milliliters in three cups?" and, in response, receive an answer from the system, e.g., in the form of synthesized voice output. Alternatively, a user might ask the system questions such as "when does my nearest gas station close," or, upon preparing to leave the house, "should I wear a coat today?"

Further, a user may ask a query of the system, and/or issue a command, that relates to the user's personal information. For example, a user might ask the system "when is my meeting with John?" or command the system "remind me to call John when I get back home."

SUMMARY

For a speech-enabled system, the users' manner of interacting with the system is designed to be primarily, if not exclusively, by means of voice input. Consequently, the system, which potentially picks up all utterances made in the surrounding environment including those not directed to the system, must have some way of discerning when any given utterance is directed at the system as opposed, e.g., to being directed at an individual present in the environment. One way to accomplish this is to use a hotword, which by agreement among the users in the environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which may perform speech recognition techniques or use audio features and neural networks to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

A speech-enabled system may use the utterance of a hotword as an indication of a user's intention to interact with a system. In the case where the speech-enabled system detects speech from different users, the system processes and transmits audio data that includes speech from a user who initially speaks a hotword and will limit processing and suppress transmission of audio data that includes speech from other users who did not speak the hotword. The system may use a hotworder to identify the portion of the audio data that includes a hotword. A speaker diarization module may analyze the portion of the audio data that includes the hotword to identify characteristics of the user's speech and identify subsequently received audio data that includes speech from the same user. The speaker diarization module may analyze other subsequently received speech audio and identify audio portions where the speaker is not the same speaker as the hotword speaker. The system may remove those portions spoken by other users because the other users did not express their intention to interact with the system by speaking the hotword. By removing those portions spoken by other users, the system preserves the privacy of other users who may be unintentionally interacting with the speech-enabled system.

According to an innovative aspect of the subject matter described in this application, a method for speaker diarization includes the actions of receiving, by a computing device, audio data corresponding to an utterance; determining that the audio data includes an utterance of a predefined hotword spoken by a first speaker; identifying a first portion of the audio data that includes speech from the first speaker; identifying a second portion of the audio data that includes speech from a second, different speaker; and based on determining that the audio data includes an utterance of the predefined hotword spoken by the first speaker, transmitting the first portion of the audio data that includes speech from the first speaker and suppressing transmission of the second portion of the audio data that includes speech from the second, different speaker.

These and other implementations can each optionally include one or more of the following features. The actions further include, based on determining that the audio data includes an utterance of the predefined hotword spoken by the first speaker, replacing the second portion of the audio data that includes speech from the second, different speaker with a corresponding period of silence. The action of transmitting the first portion of the audio data that includes speech from the first speaker and suppressing transmission of the second portion of the audio data that includes speech from the second, different speaker includes transmitting the first portion of the audio data that includes speech from the first speaker and the corresponding period of silence in place of the second portion of the audio data that includes speech from the second, different speaker. The actions further include identifying an application running in a foreground of the computing device.

The second portion of the audio data that includes speech from the second, different speaker is replaced with the corresponding period of silence based on the application running in the foreground of the computing device. The actions further include, based on determining that the audio data includes an utterance of the predefined hotword spoken by the first speaker, removing the second portion of the audio data that includes speech from the second, different speaker. The action of transmitting the first portion of the audio data that includes speech from the first speaker and suppressing transmission of the second portion of the audio data that includes speech from the second, different speaker includes transmitting the first portion of the audio data that includes speech from the first speaker and without a corresponding period of silence in place of the second portion of the audio data that includes speech from the second, different speaker. The actions further include identifying an application running in a foreground of the computing device. The second portion of the audio data that includes speech from the second, different speaker is removed without replacing with the corresponding period of silence based on the application running in the foreground of the computing device.

The actions further include identifying a third portion of the audio data that includes speech from the first speaker. The action of transmitting the first portion of the audio data that includes speech from the first speaker and suppressing transmission of the second portion of the audio data that includes speech from the second, different speaker includes transmitting the first portion of the audio data that includes speech from the first speaker and the third portion of the audio data that includes speech from the first speaker and suppressing transmission of the second portion of the audio data that includes speech from the second, different speaker. The first portion of the audio data that includes speech from the first speaker precedes the second portion of the audio data that includes speech from the second, different speaker. The second portion of the audio data that includes speech from the second, different speaker precedes the third portion of the audio data that includes speech from the first speaker. The first portion of the audio data that includes speech from the first speaker does not include the utterance of the predefined hotword.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A user's privacy may be protected when the user's speech is detected by a microphone of a system and the user did not speak a hotword to initiate interaction with the system. The system may remove speech from users who do not initialize interaction with the system by speaking a hotword. In other words, there is an opportunity to protect a bystander's privacy when the bystander's speech is detected by a microphone and the bystander did not speak a hotword to explicitly interact with the system. The system may remove speech from bystanders who do not initialize the interaction with the system by speaking the hotword.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
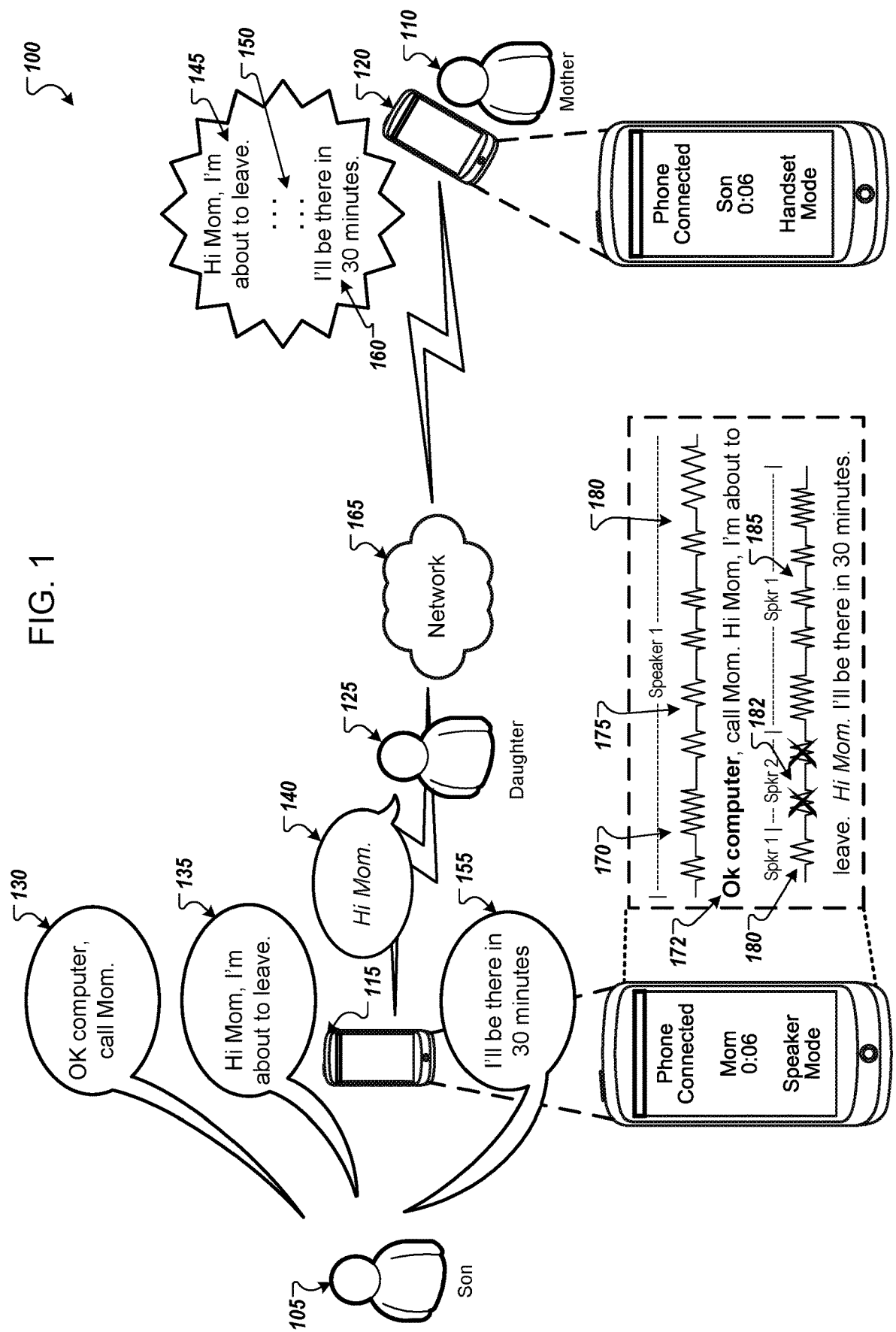
FIG. 1 illustrates an example system that uses speaker diarization to edit audio during a telephone call.

FIG. 1 illustrates an example system 100 that uses speaker diarization to edit audio during a telephone call. Briefly, and as described in more detail below, son 105 and mother 110 are having a telephone call using computing device 115 and computing device 120 over network 165. Son 105 initiated the telephone call by speaking utterance 130 that included the hotword "ok computer" and the command "call mom." During the telephone call, the microphone of computing device 115 detects speech from both son 105 and daughter 125. Because the son 105 spoke the hotword, the computing device 115 transmits audio data containing speech from son 105 but not from other users such as daughter 125.

In the example shown in FIG. 1, the son 105 initiates a telephone call by speaking the utterance 130, "Ok computer, call mom." The computing device 115 detects the utterance 130 and processes the corresponding audio data. The computing device 115 may be any type of device configured to place a telephone call such as telephone, smart phone, laptop computer, desktop computer, smart speaker, television, smart watch, or any other similar device.

The computing device 115 processes the audio data 170 and identifies the hotword 172, "ok computer." The computing device 115 continues to process the audio data 175 and identifies the command "call mom." The computing device 115 initiates the telephone call with the computing device 120 over the network 165, which corresponds to the telephone number for "mom" in the contacts of computing device 115.

The telephone call connects between the computing device 115 and computing device 120 over the network 165. During the telephone call, the user 105 speaks utterance 135 saying, "Hi Mom, I'm about to leave." The microphone of the computing device 115 detects the utterance 135, and the computing device 115 processes the corresponding audio data 180. The computing device 115 determines that the same person spoke the hotword in utterance 130 and the utterance 135. The computing device 115 transmits the audio data 180 of the utterance 135 to the computing device 120 over the network 165. The audio speaker of the computing device 120 outputs the audio 145 corresponding to utterance 135. Mother 110 hears, "Hi Mom, I'm about to leave."

The telephone call continues. Daughter 125 may enter the room where son 105 is having the telephone call on speaker mode or using a smart speaker that any sounds in the surrounding area. Daughter 125 may realize that son 105 is speaking to mother 110 and says utterance 135. The microphone of the computing device 115 detects daughter 125 speaking utterance 140 saying, "Hi Mom." The computing device 115 processes the audio data 182 that corresponds to the utterance 140. The computing device 115 determines that a different person spoke utterance 140 and the hotword 172 in utterance 130. The computing device 115 suppresses transmission of the audio data 182 that corresponds to the utterance 140 because a person other than the person who spoke the hotword 172 in utterance 130 spoke utterance 140.

In this case, daughter 125 spoke utterance 140. Daughter 125 may be a coincidental user or a non-intended user or both.

In the case where the computing device 115 is a computing device that executes a telephone application, such as a smart phone or smart speaker, the computing device 115 may transmit a corresponding period of silence 150 in place of transmitting the audio data 182 of the utterance 140. For example, if the daughter 125 speaks utterance 140 for one second, then the computing device 115 suppresses transmission of the corresponding audio data 182 to the computing device 120 and instead transmits audio data that corresponds to one second of silence 150. By preserving the timing of the utterance 135 and the utterance 140, the conversation may not sound altered to mother 110. Instead, mother 110 may believe that son 105 has paused during the conversation.

Son 105 continues speaking utterance 155 saying, "I'll be there in 30 minutes." The microphone of the computing device 115 detects the utterance 155. The computing device 115 processes the audio data 185 corresponding to the utterance 155. The computing device 115 determines that the same person spoke the hotword 172 in utterance 130 and the utterance 155.

The computing device 115 transmits the audio data 185 of the utterance 155 to the computing device 120 over the network 165. The audio speaker of the computing device 120 outputs the audio 160 corresponding to utterance 155. Mother 110 hears, "I'll be there in 30 minutes." The telephone call continues until son 105 or mother 110 ends the call.

Figure 2:
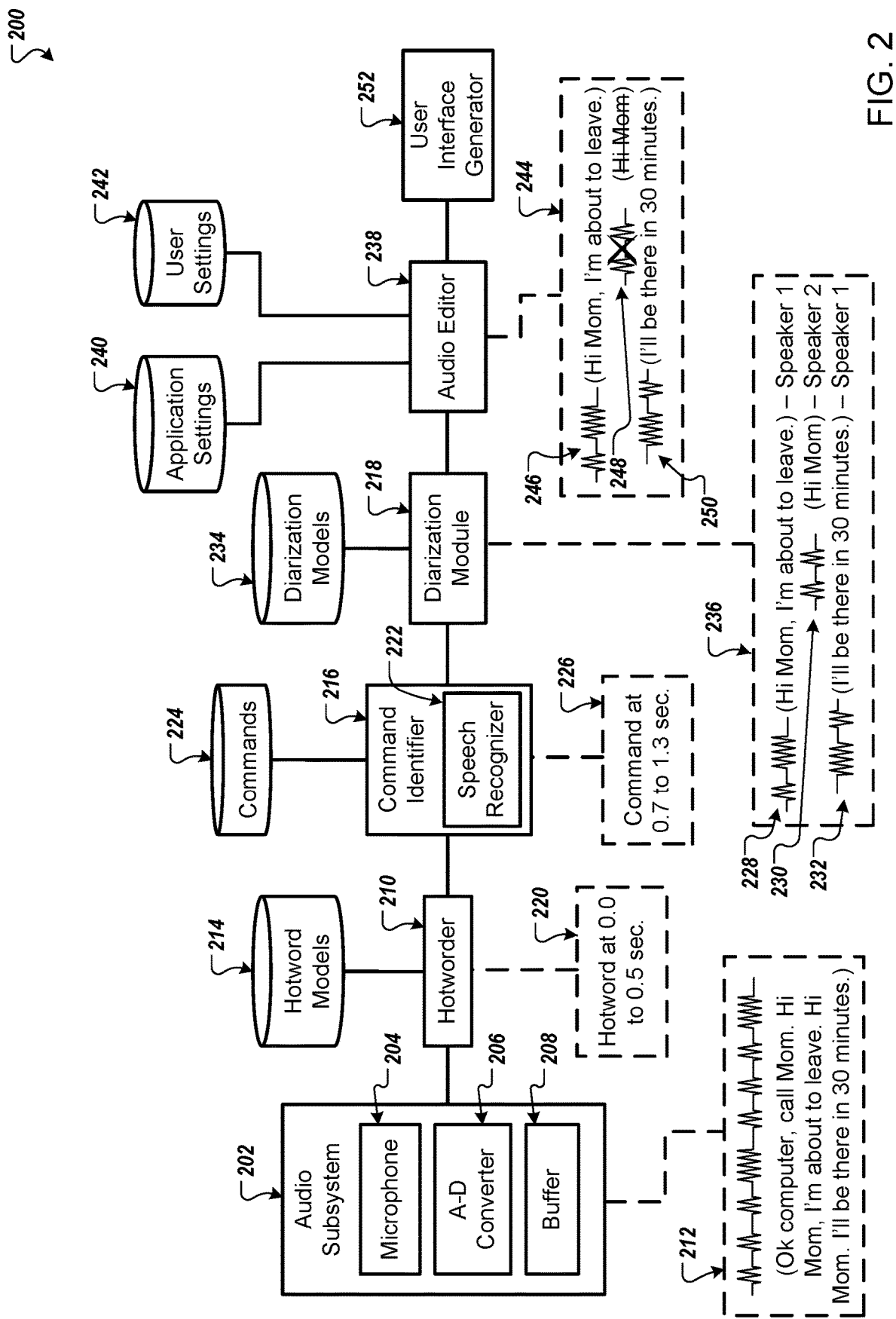
FIG. 2 illustrates an example system for implementing speaker diarization.

FIG. 2 illustrates an example system 200 for implementing speaker diarization. The system 200 may be any type of computing device that is configured to receive, process, and transmit speech audio. For example, the system 200 may be similar to computing device 115 or computing device 120 of FIG. 1. The components of system 200 may be implemented in a single computing device or distributed over multiple computing devices.

The system 200 includes an audio subsystem 202. The audio subsystem 202 may include a microphone 204, analog to digital converter 206, buffer 208, and various other audio filters. The microphone 204 may be configured to detect sounds in the surrounding area such as speech. The analog to digital converter 206 may be configured to sample the audio data detected by the microphone 204. The buffer 208 may store the sampled audio data for processing by the system 200. In some implementations, the audio subsystem 202 may be continuously active. In this case, the microphone 204 may be constantly detecting sound. The analog to digital converter 206 may be constantly sampling the detected audio data. The buffer 208 may store the latest sampled audio data such as the last ten seconds of sound. If other components of the system 200 do not process the audio data in the buffer 208, then the buffer 208 may overwrite the previous audio data.

In the example shown in FIG. 2, the microphone 204 may detect the utterance that corresponds to "Hi Mom, I'm about to leave. Hi Mom. I'll be there in 30 minutes." The analog to digital converter 206 may sample the received audio data, and the buffer 208 may store the sampled audio data 212.

The audio subsystem 202 provides audio data 212 to the hotworder 210. The hotworder 210 is configured to identify hotwords in audio received through the microphone 204 and/or stored in the buffer 208. The hotworder 210 may be referred to as a hotword detector, keyword spotter, or keyword detector. In some implementations, the hotworder 210 may be active at any time that the system 200 is powered on. The hotworder 210 continuously analyzes the audio data stored in the buffer 208. The hotworder 210 computes a hotword confidence score that reflects the likelihood that current audio data in the buffer 208 includes a hotword. To compute the hotword confidence score, the hotworder 210 may use the hotword models 214. The hotworder 210 may extract audio features from the audio data 212 such as filterbank energies or mel-frequency cepstral coefficients. The hotworder 210 may use classifying windows to process these audio features such as by using a support vector machine or a neural network. In some implementations, the hotworder 210 does not perform speech recognition to determine a hotword confidence score. The hotworder 210 determines that the audio includes a hotword if the hotword confidence score satisfies a hotword confidence score threshold. For example, the hotworder 210 determines that the audio 212 includes the hotword if the hotword confidence score is 0.8 and the hotword confidence score threshold is 0.7.

In the example shown in FIG. 2, the hotworder 210 determines that the first speaker in the audio data 212 spoke the hotword "ok computer." The hotworder 210 may identify the portion of the audio data 212 that includes the hotword. For example, the hotworder 210 may provide to the command identifier 216 and diarization module 218 that the audio data between 0.0 and 0.5 seconds includes the hotword 220. The hotworder 210 may provide to the command identifier 216 data that indicates that a speaker uttered the hotword and may provide to the diarization module 218 that the audio data between 0.0 and 0.5 seconds includes the hotword.

In some implementations, the hotworder 210 may include speaker identification capabilities. In this instance, the hotword 210 may identify a particular person who spoke the hotword. For example, the hotworder 210 may determine that Alice likely spoke the hotword. The hotworder 210 may provide data indicating that Alice likely spoke the hotword to the diarization module 218. To perform speaker identification, the hotworder 210 may have previously collected speech data for a user by requesting that the user repeat various phrases. The hotworder 210 may have used the collected speech samples to train a speaker identification model.

The command identifier 216 receives the audio data 212 from the audio subsystem 202 or from the hotworder 210. In some implementations, the command identifier 216 may not search the audio data 212 for a command unless the hotworder 210 identifies a spoken hotword or the user indicates that the user is speaking a command, e.g., by selecting a command button. The command identifier 216 may include speech recognizer 222 that performs speech recognition on the audio data 212. The speech recognizer 222 may generate a transcription that the command identifier 216 analyzes for commands. The command identifier 216 may compare the transcription to the commands 224 to determine whether any of the terms in the transcription match the terms in the commands 224. The command identifier 216 may also identify objects of commands for commands that require objects. For example, the command "call" may require an object. The command identifier 216 may determine that the term following "call" may be the object, for example, "mom." Therefore, the command is "call mom."

In some implementations, the command identifier 216 may provide timing data 226 to the diarization module 218. For example, the command identifier 216 may indicate that the command "call mom" occurs between 0.7 seconds and 1.3 seconds. Following the example in FIG. 2, the audio data 212 includes a hotword between 0.0 seconds and 0.5 seconds and a command between 0.7 seconds and 1.3 seconds. In some implementations, the command identifier 216 processes the audio data 212 using the speech recognizer 222 until the command identifier 216 identifies a command. The command identifier 216 may instruct the speech recognizer 222 to stop performing speech recognition after identifying a command, for example, "call mom."

The diarization module 218 analyzes the audio data 212 and identifies the portions of the audio data spoken by different users. The diarization module 218 receives the audio data 212, data indicating that the audio data 212 includes a hotword between 0.0 and 0.5 seconds, and data indicating that the audio data 212 includes a command between 0.7 and 1.3 seconds. The diarization module 218 labels portions of the audio data 212 as spoken by the hotword speaker or not spoken by the hotword speaker by applying the diarization models 234. In some implementations, the diarization module 218 labels portions of the audio data 212 according to their speaker. The diarization models 234 may not be trained to identify speech from a particular person. The diarization module 218 applies the diarization models 234 to the audio data 212 to identify portions that are spoken by a common speaker even if the diarization model 234 does not include data for the same speaker. The diarization module 218 may identify patterns in portions spoken by the same person. For example, the diarization module 218 may identify portions with a common pitch.

In the example shown in FIG. 2, the diarization module 218 analyzes the audio data 212. The diarization module 218 labels the speaker of the audio data 212 that includes the hotword between 0.0 and 0.5 seconds as speaker 1. In some implementations, the diarization module 218 may not process the portion of the audio data 212 that includes the command. In this case, the diarization module 218 may not apply a speaker label to the portion of the audio data between 0.7 and 1.3 seconds. The diarization module 218 determines that the portion 228 of the audio data that corresponds to "Hi Mom, I'm about to leave" is spoken by speaker 1. The diarization module 218 determines that the portion 230 of the audio data that corresponds to "Hi Mom" is spoken by speaker 2 who is different from speaker 1. The diarization module 218 determines that the portion 232 of the audio data that corresponds to "I'll be there in 30 minutes" is spoken by speaker 1. The diarization module 218 may generate timing data to designate the portions of audio data 228, 230, and 232 from each other. The timing data may identify the beginning and ending of each portion.

In some implementations, the diarization module 218 may process audio data that the system 200 is going to transmit to another computing device, such as a server or mobile phone. For example, the diarization module 218 may process and identify speakers of in the audio data that begins after the command "call mom" because that is the audio data being transmitted to the computing device of the other user on the telephone call.

The diarization module 218 provides the audio data 236 to the audio editor 238. The audio editor 238 updates the audio data 236 to remove portions of the audio data spoken by speakers other than the hotword speaker according to the application settings 240 and the user settings 242. In the example of FIG. 2, the audio editor 238 generates audio data 244 by removing audio portion 248, which was spoken by a speaker who did not speak the hotword, speaker 2 and retaining audio portions 246 and 250, which were spoken by the hotword speaker, speaker 1. In some implementations, the audio editor 238 replaces audio portion 248 with a corresponding period of silence. In some implementations, the audio editor 238 stitches together audio portion 246 with audio 250 without a corresponding period of silence for audio portion 248.

The audio editor 238 accesses the application settings 240 and the user settings 242 to determine whether to replace the audio of the non-hotword speaker with a corresponding period of silence or to stitch together audio of the hotword speaker. For example, the application may be a telephone application. The application settings 240 for a telephone application may indicate to preserve the timing of audio data 236. In this case, the audio editor 238 generates audio data 244 by replacing audio 248 with a corresponding portion of silence. As another example, the application may be a search application. The application settings 240 for a voice note application may not rely on timing like the telephone application. In this instance, the audio editor 238 generates audio data 244 by stitching together audio data 246 and audio data 250.

In some implementations, the audio editor 238 may edit the transcription of the audio data 236 before transmitting the transcription to another computing device. The audio editor 238 may transmit the transcription of audio data 244 which does not include the transcription for audio portion 248. For example, the audio editor 238 may transmit "Hi Mom, I'm about to leave. I'll be there in 30 minutes." The system 200 may transmit the transcription for applications such as a messaging application.

The audio editor 238 may access user settings 242 to determine how to edit the audio data 236. The user settings 244 may include settings related to how to edit audio data that includes speech of both the hotword speaker and a non-hotword speaker. In some implementations, the user settings 244 may indicate to retain audio data that includes speech of both the hotword speaker and a non-hotword speaker. In some implementations, the user settings 244 may indicate to remove audio data that includes speech of both the hotword speaker and a non-hotword speaker. In some implementations, the application settings 240 may include editing rules for audio data that includes speech of both the hotword speaker and a non-hotword speaker.

The system includes a user interface generator 252. The user interface generator 252 may generate a user interface that presents a user with options for editing the audio data 236. For example, the user interface may include an option for generating audio data 244. The user may select an option to remove audio portion 248 before transmitting the audio data. The user may override the removal of audio portion 248 and choose to have audio portion 248 included with audio portions 246 and 250 when transmitting the audio data to another computing device.

In some implementations, the user interface generator 252 may indicate the editing of the audio data 236 by the audio editor 238. For example, the user interface generator 252 may generate an interface indicating the transcriptions of the audio data that the audio editor 238 was transmitting and the transcriptions of the audio data that the audio editor 238 was removing. The user interface may also include data related to the identified speakers for each audio portion.

In some implementations, the diarization module 218 may process the audio data 212 after the hotworder 210 and before the command identifier 216. In this instance, the hotworder 210 identifies the portion of the audio data 212 that includes the hotword. The diarization module 218 transmits audio data that includes speech from the hotword speaker and suppresses transmission of audio data that includes speech from speakers other than the hotword speaker. The diarization module 218 may transmit the audio data to the command identifier 216, which transmits data to the audio editor 238. The diarization module 218 may identify, in real-time or near real-time, speaker changes in audio data 212 as the audio subsystem 202 processes detected audio.

The components of system 200 may be implemented on a client device, for example, computing device 115 or on a server, also referred to as the cloud. For example, the command identifier 216 may be implemented on a server while the other components of system 200 are implemented on a client device. The client device may be configured to remove audio that includes speech data from a user who did not speak the hotword before sending the audio to the server. By removing the speech data of the non-hotword speaker, the client device protects the privacy of the non-hotword speaker. The non-hotword speaker may be a bystander or non-intended user and likely did not intend to interact with the system.

Figure 3:
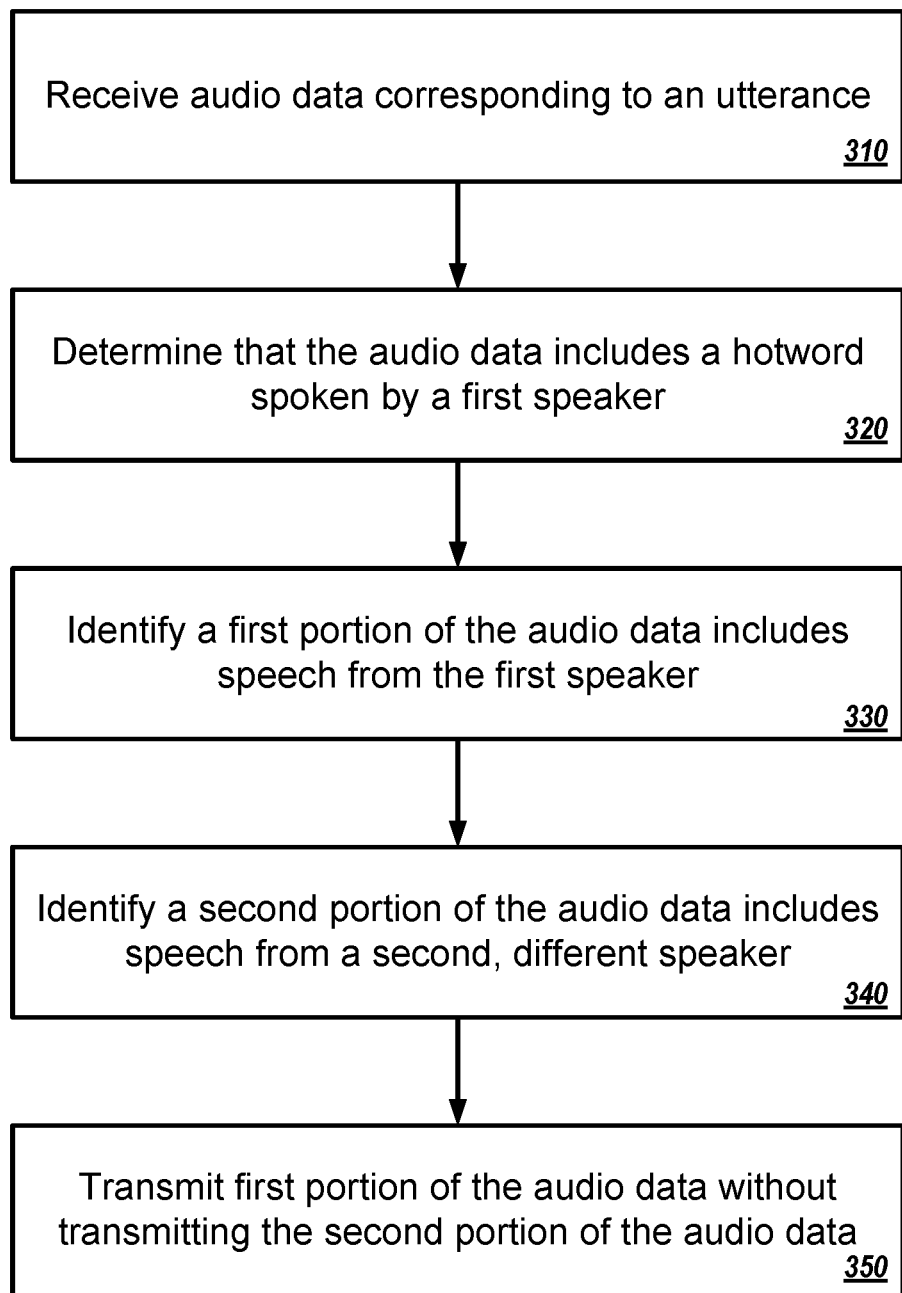
FIG. 3 is a flowchart of an example process for speaker diarization.

FIG. 3 illustrates an example process 300 for speaker diarization. In general, the process 300 performs speech recognition on audio corresponding to media content based on the audio including a hotword and a watermark. The process 300 will be described as being performed by a computer system comprising one or more computers, for example, the computing device 115 of FIG. 1 or system 200 of FIG. 2.

The system receives audio data corresponding to an utterance (310). The utterance may include speech from more than one speaker. For example, the utterance could be, "Ok computer, call Mom. Hi Mom, I'm about to leave. Hi Mom. I'll be there in 30 minutes." The system determines that the audio data includes an utterance of a predefined hotword spoken by a first speaker (320). The system may use a hotworder to identify the hotwords in the audio data. For example, the system may determine that the audio data likely includes the hotword "ok computer."

The system identifies a first portion of the audio data that includes speech from the first speaker (330). In some implementations, the system analyzes the audio data that does not include the hotword and any command the follows the hotword. For example, the system may not analyze the portion of the audio data that corresponds to "ok computer, call Mom." The system may analyze the audio data that follows the command. The system identifies portions of the audio data that include speech from the first speaker who spoke the hotword. For example, the system may determine that the audio data that corresponds to "Hi Mom, I'm about to leave" is spoken by the first speaker who also spoke the hotword.

The system identifies a second portion of the audio data that includes speech from a second, different speaker (340). The system analyzes the audio data to identify portions of the audio data that includes speech from speakers other than the hotword speaker. For example, the system may determine that, "Hi Mom" is spoken by a speaker other than the hotword speaker.

In some implementations, the system may identify the speaker of a third portion of the audio data. For example, the system may determine that the audio data that corresponds to, "I'll be there in 30 minutes" is spoken by the hotword speaker.

The system, based on determining that the audio data includes an utterance of the predefined hotword spoken by the first speaker, transmits the first portion of the audio data that includes speech from the first speaker and suppressing transmission of the second portion of the audio data that includes speech from the second, different speaker (350). In some implementations, the system may replace the second portion of the audio data with a corresponding period of silence in instances where the timing of the speech should be preserved, for example, in a telephone call. In some implementations, the system may replace stitch together the portions of the audio data that include speech from the hotword speaker and remove the audio data that include speech from a speaker other than the hotword speaker. Whether the system preserves the timing may be based on application settings or user settings.

By not transmitting the audio data that includes speech from speakers other than the hotword speaker, the system preserves the privacy of other speakers whom the microphone of the system may detect. The system uses the utterance of the hotword to indicate that the hotword speaker intends to interact with the system. The system may not store audio data or transcripts of audio data spoken by a speaker other than the hotword speaker. In instances where the system generates a transcript of the audio data, the system may delete portions of the transcript that were spoken by a speaker other than the hotword speaker.

Figure 4:
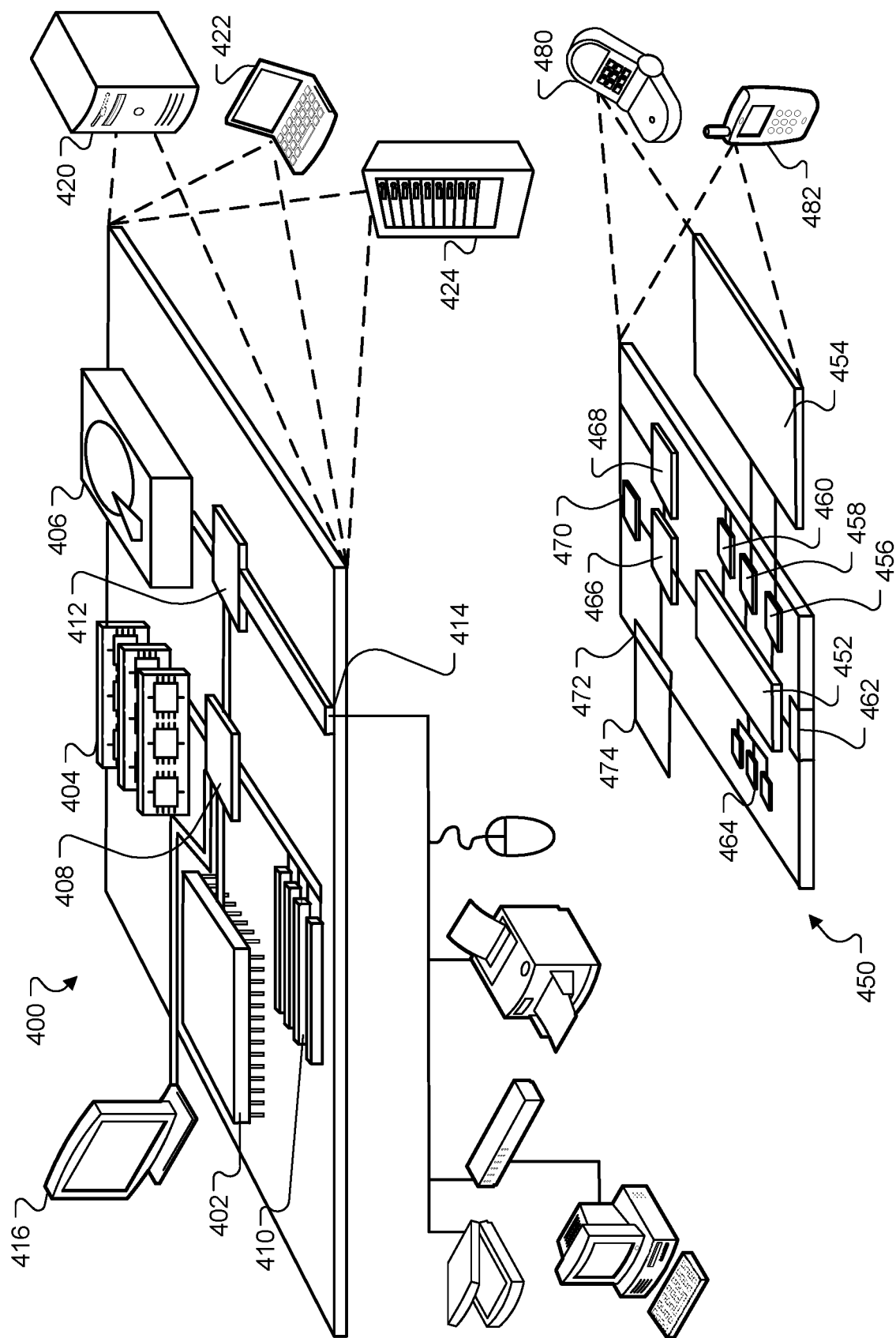
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method that when executed on data processing hardware causes the data processing hardware to perform operations comprising:
    obtaining previously collected speech data for a particular person;
    receiving audio data comprising:
        a first portion corresponding to a first utterance; and
        a second portion corresponding to a second utterance;
    processing, using a speaker identification model trained on the previously collected speech data for the particular person to recognize speech spoken by the particular person:
        the first portion of the audio data to identify that the particular person spoke the first utterance; and
        the second portion of the audio data to identify that a speaker other than the particular person spoke the second utterance;
    processing the audio data to generate a transcription of the first utterance and the second utterance; and
    updating the transcription by:
        labeling the transcription with a first label indicating that the first utterance was spoken by the particular person; and
        deleting a corresponding portion of the transcription that includes the second portion of the audio data.

2. The method of claim 1, wherein updating the transcription further comprises updating the transcription by labeling the transcription with a second label indicating that the second utterance was spoken by the speaker other than the particular person.

3. The method of claim 1, wherein the second label does not uniquely identify the speaker that spoke the second utterance.

4. The method of claim 1, wherein the operations further comprise transmitting the updated transcription to a computing device associated with the particular person.

5. The method of claim 1, wherein the operations further comprise transmitting the updated transcription to a computing device associated with the speaker that spoke the second utterance.

6. The method of claim 1, wherein processing the first portion of the audio data using the speaker identification model comprises:

determining that the first utterance comprises a predefined hotword; and identifying the particular person as the speaker that spoke the first utterance based on determining that the first utterance comprises the predefined hotword.

7. The method of claim 1, wherein the operations further comprise:

identifying an application running in a foreground of a computing device that captured the audio data, wherein updating the transcription is based on the identified application running in the foreground of the computing device.

8. The method of claim 1, wherein the operations further comprise updating the audio data to remove the second portion of the audio data.

9. The method of claim 1, wherein the data processing hardware resides on a server.

10. A system comprising:

data processing hardware; and memory hardware in communication with the data processing hardware and storing instructions that when executed on the data processing hardware cause the data processing hardware to perform operations comprising:

obtaining previously collected speech data for a particular person;

receiving audio data comprising:
  a first portion corresponding to a first utterance; and
  a second portion corresponding to a second utterance;

processing, using a speaker identification model trained on the previously collected speech data for the particular person to recognize speech spoken by the particular person:
  the first portion of the audio data to identify that the particular person spoke the first utterance; and
  the second portion of the audio data to identify that a speaker other than the particular person spoke the second utterance;

processing the audio data to generate a transcription of the first utterance and the second utterance; and updating the transcription by:

labeling the transcription with a first label indicating that the first utterance was spoken by the particular person; and deleting a corresponding portion of the transcription that includes the second portion of the audio data.

11. The system of claim 10, wherein updating the transcription further comprises updating the transcription by labeling the transcription with a second label indicating that the second utterance was spoken by the speaker other than the particular person.

12. The system of claim 10, wherein the second label does not uniquely identify the speaker that spoke the second utterance.

13. The system of claim 10, wherein the operations further comprise transmitting the updated transcription to a computing device associated with the particular person.

14. The system of claim 10, wherein the operations further comprise transmitting the updated transcription to a computing device associated with the speaker that spoke the second utterance.

15. The system of claim 10, wherein processing the first portion of the audio data using the speaker identification model comprises:

determining that the first utterance comprises a predefined hotword; and identifying the particular person as the speaker that spoke the first utterance based on determining that the first utterance comprises the predefined hotword.

16. The system of claim 10, wherein the operations further comprise:

identifying an application running in a foreground of a computing device that captured the audio data, wherein updating the transcription is based on the identified application running in the foreground of the computing device.

17. The system of claim 10, wherein the operations further comprise updating the audio data to remove the second portion of the audio data.

18. The system of claim 10, wherein the data processing hardware resides on a server.

* * * * *